United States Patent [19]

Stouffer

[11] 3,876,031
[45] Apr. 8, 1975

[54] ELECTRICAL LOCK CONTROL MEANS FOR SAFETY BELT RETRACTOR

[75] Inventor: Richard C. Stouffer, Auburn Heights, Mich.

[73] Assignee: Allied Chemical Corporation, New York, N.Y.

[22] Filed: May 2, 1973

[21] Appl. No.: 356,660

[52] U.S. Cl............ 180/82 C; 242/107.4; 297/388; 307/10 SB
[51] Int. Cl........................................... A62b 35/02
[58] Field of Search............ 180/82 C; 200/61.58 B; 242/107.4, 107.3, 107.2, 107 SB; 280/150 SB; 297/388; 307/10 SB

[56] References Cited
UNITED STATES PATENTS

| | | | |
|---|---|---|---|
| 3,172,700 | 3/1965 | Haas | 180/82 C |
| 3,240,510 | 3/1966 | Spouge | 180/82 C |
| 3,294,447 | 12/1966 | Riley | 297/388 |
| 3,308,902 | 3/1967 | Carter | 180/82 C |

*Primary Examiner*—Robert B. Reeves
*Assistant Examiner*—Thomas E. Kocovsky
*Attorney, Agent, or Firm*—Jonathan Plaut; Ernest D. Buff

[57] ABSTRACT

A safety belt retractor of the inertia responsive or automatic locking variety is provided with an electrical lock control means which is inexpensive to construct and functions in a highly reliable manner to disable the retractor's locking means during a preselected time interval following initial protraction of the belt. The electrical lock control means can advantageously be provided with electrical deactivating means associated with the gear selector of the vehicle and operative to deactivate the electrical lock control means and thereby prevent disabling of the locking means when the vehicle is placed in a driving gear.

12 Claims, 3 Drawing Figures

TO SIGNAL MEANS

TO ELECTROMAGNETIC MEANS

TO POWER SOURCE

TO SWITCH MEANS

LOCKING MEANS

TO SIGNAL MEANS

ELECTRICAL LOCK CONTROL MEANS FOR SAFETY BELT RETRACTOR

BACKGROUND OF THE INVENTION

1. FIELD OF THE INVENTION

This invention relates to safety belt retractors for passengers in vehicles such as automobiles, and more particularly, to an electrical lock control means associated with the locking mechanism of a safety belt retractor of the inertia responsive or automatic locking variety, for disabling the locking mechanism and thereby preventing premature locking of the retractor during a preselected period of time following initial protraction of the belt.

2. DESCRIPTION OF THE PRIOR ART

Safety belt retractors have been recently developed which should significantly decrease the number of fatalities and serious injuries resulting from motor vehicle accidents. Most of these retractors include a belt reel which is continuously biased in a retracting direction and a locking mechanism, such as a pawl engageable with ratchet teeth on the end of the belt reel, adapted to lockingly engage the belt reel in response to a predetermined change in the rate or direction of movement of the belt. One of the problems with these retractors is their tendency to lock prematurely and thereby interfere with the attempts of vehicle occupants to "buckle up." To overcome this problem, lock control mechanisms of the type described in U.S. Pat. No. 3,343,764 to Webb and U.S. Pat. No. 3,384,415 to Monroe have been proposed which mechanically or hydraulically delay engagement of the locking mechanism with the belt reel for a predetermined time interval following initial protraction of the belt. Such mechanical or hydraulic lock control mechanisms must be carefully constructed and calibrated to close tolerances. Moreover, they are subject to wear and tend to entrap particles of dirt and corroded material which impair their accuracy. Further, these mechanical or hydraulic mechanisms render the seat belt system ineffective to protect the occupants in the event of sudden deceleration of the vehicle which may occur during the preselected time interval.

SUMMARY OF THE INVENTION

The present invention provides an economical and reliable safety belt retractor of the inertia responsive or automatic locking type having an electrical lock control means. The retractor of the present invention comprises a support means, reel means rotatably mounted on the support means, belt means attached to the support means for protraction and retraction with respect thereto, biasing means for urging the reel means in a retracting direction, locking means mounted on the support means and adapted to lockingly engage the reel means in response to a predetermined change in the rate or direction of movement of the belt and electrical lock control means associated with the locking means and responsive to protraction of the belt means, for disabling the locking means during a preselected time interval following initial protraction of the belt means. The electrical lock control means may include: (1) first circuit means connected to a source of electrical power, (2) switch means electrically connected to the first circuit means and structurally connected to the reel means so as to ground the first circuit means upon rotation of the reel means for a preselected distance in a belt protracting direction, thereby energizing said first circuit means, (3) electromagnetic means connected to said first circuit means so as to be energized upon the grounding thereof and magnetically coupled to said locking means and (4) second circuit means connected to the first circuit means for deenergizing said electromagnetic means after said preselected time interval.

During the preselected time interval, which is at least about 3 seconds, and preferably about 20 to 35 seconds, the electrical lock control means prevents the locking means from engaging the reel means in response to a predetermined change in the rate or direction of movement of the belt means. The belt means can be protracted and retracted freely without causing the retractor to lock, and fastening of the belt means about vehicle occupants is facilitated. Upon completion of the preselected time interval, the electrical lock control means permits the locking means to lockingly engage the reel means in the conventional manner.

The electrical lock control means of the safety belt retractor of this invention is easy to fabricate and is less subject to inaccuracy or failure resulting from wear or entrapped particles of dirt and corroded material than the aforesaid mechanical or hydraulic lock control mechanisms. In addition, the electrical lock control means may be economically provided with electrical deactivating means associated with the gear selector of the vehicle and operative to disable the second circuit means when the transmission of the vehicle is placed in a driving gear. The electrical deactivating means serves to protect the user in the event of a sudden deceleration of the vehicle occurring during the preselected time interval. Such sudden deceleration would occur, for example, if the vehicle became involved in a "quick crash," that is to say, one occurring during the preselected time interval but after the user has fastened the belt quickly and driven the vehicle away. As a result, the safety belt retractor of the present invention is less expensive, safer and more reliable in operation than retractors having mechanical or hydraulic lock control mechanisms.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENT

Figure 1:
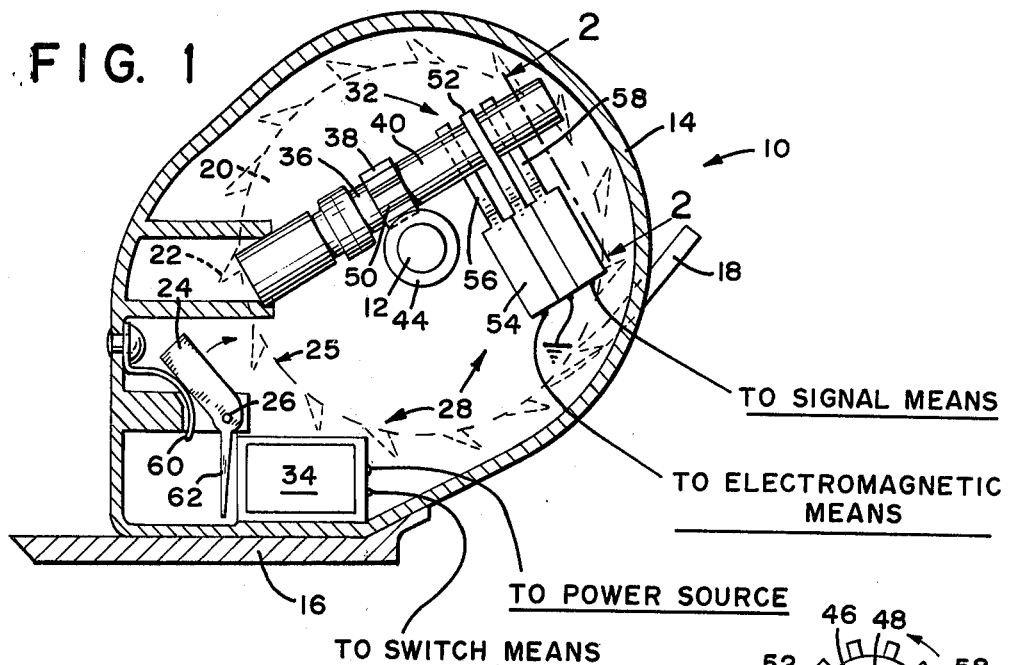
FIG. 1 is a longitudinal section through one form of a safety belt retractor incorporating the present invention.

Referring to FIG. 1 of the drawings, there is illustrated one form of a safety belt retractor incorporating the electrical lock control means of the present invention. Other forms of the retractor can also be used. The retractor, shown generally at 10, should therefore be interpreted as illustrative and not in a limiting sense. As illustrated, the retractor 10 has a reel means 12 rotatably mounted on a support means 14. The support means is a load bearing member and is adapted to be bolted or otherwise secured to an anchorage point 16 on the vehicle. A belt means 18, formed of a flexible nylon web or the like, is attached to the reel means 12 for protraction and retraction with respect thereto. The reel means 12 is provided with a biasing means, such as a torsion return spring or the like, for urging the reel means 12 in a retracting direction. Fixedly mounted on the reel means 12 for rotation therewith is a ratchet means 20, the periphery of which has a plurality of circumferentially spaced ratchet teeth 22 formed by closely spaced notches or slots. As shown in the drawing, the ratchet means 20 may be directly mounted on the reel means 12. However, the term "ratchet means" in this specification is intended to include structure, including ratchet teeth, connected to but not directly mounted on the reel means (for example, the structure utilized for the webbing sensitive inertia locking retractor described in U.S. application Ser. No. 162,073 of Beller, filed July 13, 1972, which is incorporated herein by reference thereto). A pawl means 24 is mounted on pivot 26 journaled on the support means 14 for engaging the ratchet means 20 to stop rotation of the reel means 12, thereby preventing further protraction of the belt means 18. Each of the reel means 12, support means 14, ratchet means 20 and pawl means 24 is generally constructed of a suitable metal, such as heat-treated steel or the like.

The pawl means and ratchet means collectively form a locking means shown generally at 25, which is adapted to lockingly engage the reel means 12 in response to a preselected change in the rate (in the case of inertia responsive locking means) or direction of movement (in the case of automatic locking means) of the belt means 18. Typical inertia responsive and automatic locking means are described in U.S. Pat. Nos. 3,416,747 and 3,558,075, respectively, to Stoffel, and are well known to those skilled in the art.

Figure 3:
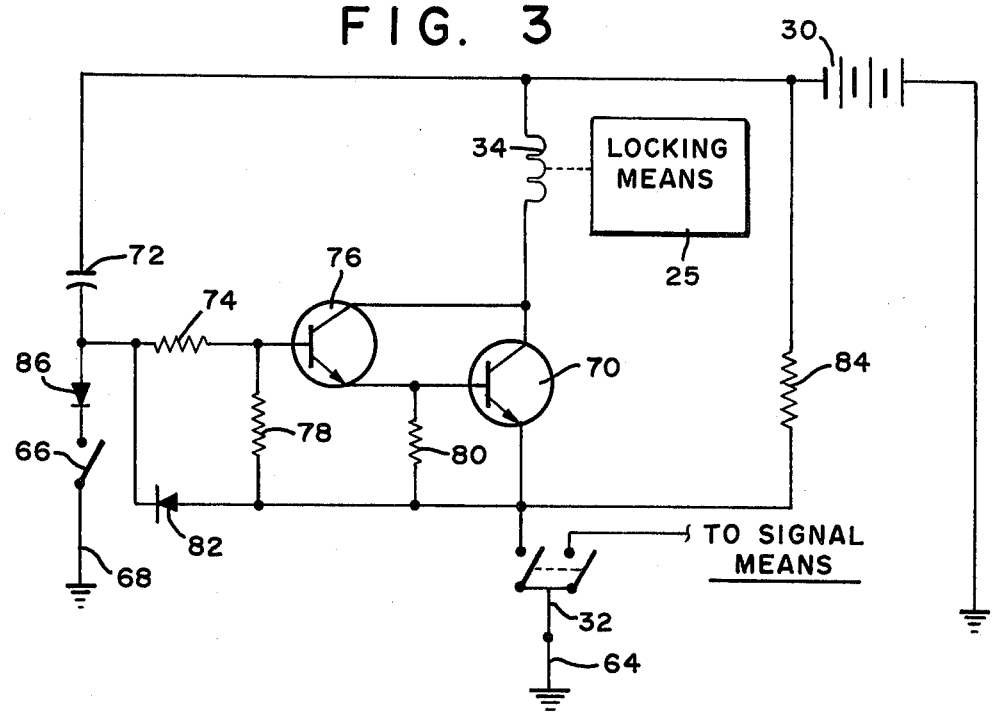
FIG. 3 is a schematic electrical diagram of the electrical lock control means of the retractor.

In order to facilitate fastening of the belt means 18 about occupants of the vehicle, the locking means 25 has associated therewith an electrical lock control means, shown generally at 28. The electrical lock control means 28 is responsive to protraction of the belt means 18 and operates to disable the locking means 25 during a preselected time interval following initial protraction thereof. A preferred form of the electrical lock control means 28 has a first circuit means connected to a source of electrical power 30 (as shown in FIG. 3). The first circuit means is electrically connected to a switch means, such as a double pole single throw switch, shown generally at 32. Switch means 32 is electrically connected between ground and the first circuit means and structurally connected to the reel means 12 so as to ground the first circuit means upon rotation of the reel means for a preselected distance, typically at least about 1 inch and preferably about 5-25 inches, in the belt protracting direction. The first circuit means becomes energized upon being grounded by the switch means 32. An electromagnetic means 34 is connected to the first circuit means so as to be energized upon the grounding thereof and magnetically coupled to the locking means 25. The electromagnetic means 34 is operable when energized to disable the locking means 25. A second circuit means is connected to the first circuit means and deenergizes the electromagnetic means 34 after the preselected time interval.

Figure 2:
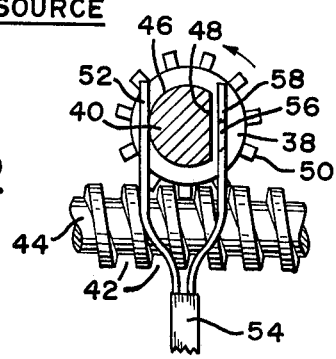
FIG. 2 is a section taken along the line 2—2 of FIG. 1.

In FIGS. 1 and 2 there is illustrated a preferred form of the switch means 32. Such means can comprise a shaft 36 having a geared portion 38 and a cam portion 40. Geared portion 38 is provided with a plurality of teeth 50 adapted to mesh with a plurality of corresponding grooves 42 on a spool 44 (or extension thereof) to which the belt means 18 is connected. The geared portion 38 and the grooves 42 form a worm wherein rotation of the reel means 12 effects rotation of the shaft 36 in a typical ratio of about 12 to 1. Cam portion 40 is provided with an arcuate portion 46 and a planar portion 48. The cam portion 40 is grounded by contact between arcuate portion 46 and terminal 52 of a contact member 54. The latter is also provided with a terminal 56 connected to the electromagnetic means 34 through the first circuit means and, optionally, a terminal 58 connected to circuit means for deenergizing an ignition interlock or signal warning system (not shown) of the vehicle.

When the belt means 18 is fully retracted, the planar portion 48 of cam portion 40 is substantially parallel to and does not contact terminals 56 and 58. Upon rotation of the reel means 12 in the belt protracting direction, shaft 36 rotates in the direction of the arrow (as shown in FIG. 2), bringing arcuate portion 46 into contact with terminals 56 and 58. Switch means 32 is thus moved from an open to a closed position which grounds the first circuit means, whereby the latter becomes energized.

The electromagnetic means 34 may be of the tractive or portive variety. One type of electromagnetic means 34 which is suitable is a bar or horseshoe electromagnet. Electromagnetic means having a movable core can also be used, although electromagnetic means having a fixed core are preferred. The magnetic coupling between the electromagnetic means 34 and the locking means 25 will also vary depending on the construction of the locking means 25 and the type of electromagnetic means 34 employed. In the embodiment shown in FIG. 1, the locking means 25 has a spring means 60, such as a leaf spring or the like, connected to the pawl means 24 so as to bias the pawl means 24 in the direction of the ratchet means 22. The electromagnetic means 34 is disposed adjacent to the pawl means 24 so that tail portion 62 of pawl means 24 lies in the path of the magnetic field applied during energization thereof. Due to the strength of the magnetic field, the force of attraction generated between the electromagnetic means 34 and the tail portion 62 has a magnitude greater than that of the biasing force exerted on pawl means 24 by spring means 60. Thus, the electromagnetic means 34 operates upon being energized to seize and hold the pawl means 24 thereagainst, thereby preventing engagement between the pawl means 24 and teeth 22 of ratchet means 20. Alternately, the electromagnetic means 34 can be adapted to operate upon being energized to hold the pawl means thereagainst, thereby preventing the engagement thereof with ratchet teeth 22. When the electromagnetic means 34 is deenergized, as by completion of the preselected time interval, the biasing force of spring means 60 forces pawl means 24 into engagement with ratchet means 20. Upon movement of the belt in the retracting direction, the pawl means 24 is forced away from ratchet means 20 by means of a plunger, clutch mechanism or the like, whereby tail portion 62 is moved into contact with the electromagnetic means 34.

In FIG. 3 there is shown, schematically, one form of an electrical diagram of the electrical lock control means 28. Other forms can also be used. The electromagnetic means 34 with which locking means 25 is associated is in series with and between the switch means 32 and the power source 30. Switch means 32 is a double pole single throw switch which is grounded through line 64 to the chassis of the vehicle (not shown). Power source 30 may be a primary or storage battery having an electrical potential of about 12 volts and typically comprises the storage battery of the vehicle. The switch means 32 and the electromagnetic means 34 are placed in series with the power source by a first circuit means to which they are connected. A second circuit means connected to the first circuit means includes a timer circuit means operable to deenergize the electromagnetic means 34 after a preselected time interval which, as previously noted, may be in the order of at least about 3 seconds and preferably about 20 to 35 seconds, following grounding of the first circuit means. The second circuit means is provided with electrical means, such as a switch 66, associated with the gear selector of the vehicle. Switch 66 is grounded to the vehicle chassis via line 68 and is connected to the gear selector by suitable linkage so as to be moved from a normally open position to a closed position when the transmission of the vehicle is placed in a driving gear.

The timer circuit means may include a transistor 70 having its collector emitter circuit in series with and between electromagnetic means 34 and switch means 32 and its base in series with the series combination of a capacitor 72 and a resistor. Preferably, the second circuit means includes a second transistor 76 having its base emitter circuit in series with and between resistor 74 and the base of transistor 70 and its collector emitter circuit in series with and between electromagnetic means 34 and the base of transistor 70. Use of the second transistor 76 increases the drive current to transistor 70, with the result that the size of the capacitor 72 can be substantially reduced.

The time interval during which the second circuit means is energized upon closure of switch means 32, and hence the time interval during which the locking means is disabled, depends upon the capacitance value of the capacitor 72 and the resistance value of resistor 74. In general, the resistance value of the resistor 74 is much greater than that provided by the series parallel combination of resistors 78 and 80 and the base emitter junction of transistors 70 and 76. The resistance values of the capacitor 72 and resistor 74 are typically about 250 microfarads and 200,000 ohms, respectively. Resistors 78 and 80 provide temperature stability due to internal leakage for transistors 70 and 76 and have resistance values in the order of about 47,000 ohms and 4,700 ohms, respectively.

Diode 82 and resistor 84 provide a discharge path for the capacitor 72 upon opening of switch means 32. Diode 86 provides isolation from positive voltages that may be present due to other circuits that may also be associated with switch 66. Generally, the resistance value of resistor 84 is about 20,000 ohms. The strength of the electromagnetic means 34 will, of course, depend upon the weight of the pawl means 24 and the magnitude of the biasing force exerted thereon by spring means 60. The electromagnetic means typically has a resistance value of about 100 to 200 ohms.

In operation, initial movement of reel means 22 in the belt protracting direction closes switch means 32, thereby grounding the first circuit means. The electromagnetic means 34 is energized and prevents pawl means 24 from engaging teeth 22 of ratchet means 20. So long as the transmission is in park, neutral or reverse, switch 66 remains open and current is transmitted through the second circuit means during a preselected time interval determined by the timer circuit means. Current passing through the second circuit means charges capacitor 72 and continues through resistor 74 and the base emitter junctions of transistors 70 and 76 and switch means 32 to ground. As a result, transistors 70 and 76 are biased on, and current from power source 30 is transmitted to ground through electromagnetic means 34, the collector emitter junctions of transistors 70 and 76 and switch means 32. Once the capacitor 72 has assumed its full charge, the base emitter currents of transistors 70 and 76 drop and the transistors are biased off. The collector emitter currents of the transistors 70 and 76 drop and the electromagnetic means 34 is deenergized, whereby the spring means 60 biases pawl means 24 into engagement with ratchet means 20. If the transmission is placed in a driving gear, switch means 66 closes to ground the second circuit means and deactivates the timer circuit means. Upon closure of switch 66, current from power source 30 passes through diode 86 and switch means 66 to ground. The base emitter currents of transistors 70 and 76 drop and the transistors are biased off as before, whereby the electromagnetic means 34 is deenergized and pawl means 24 is biased into engagement with ratchet means 20.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. A safety belt retractor comprising:
    a. support means;
    b. reel means rotatably mounted on said support means;
    c. belt means attached to said reel means for protraction and retraction with respect thereto;
    d. biasing means for urging said reel means in a belt retracting direction;
    e. locking means mounted on said support means and adapted to engage lockingly said reel means in response to a predetermined change in the direction of movement of said belt; and
    f. electrical lock control means associated with said locking means and responsive to protraction of said belt means, and having timer means for disabling said locking means during a preselected time interval following initial protraction of said belt means.

2. A safety belt retractor comprising:
    a. support means;
    b. reel means rotatably mounted on said support means;
    c. belt means attached to said reel means for protraction and retraction with respect thereto;
    d. biasing means for urging said reel means in a belt retracting direction;
    e. locking means mounted on said support means and adapted to engage lockingly said reel means in response to a predetermined change in the rate of movement of said belt; and f. electrical lock control means associated with said locking means and responsive to protraction of said belt means, and having timer means for disabling said locking means during a preselected time interval following initial protraction of said belt means.

3. A safety belt retractor as recited in claim 2, wherein said electromagnetic means is a bar electromagnet.

4. A safety belt retractor as recited in claim 2, wherein said reel means has a ratchet means mounted thereon and said locking means includes (1) pawl means mounted on said support means and engageable with said ratchet means and (2) spring means normally biasing said pawl means into engagement with said ratchet means.

5. A safety belt retractor, as recited in claim 2, wherein said electrical lock control means includes electrical deactivating means adapted for connection to the gear selector of a vehicle for deactivating said electrical lock control means, thereby preventing disabling of said locking means when the transmission of the vehicle is placed in a driving gear.

6. A safety belt retractor as recited in claim 2 wherein said electrical lock control means includes:
 a. first circuit means connected to a source of electrical power;
 b. switch means electrically connected between ground and said first circuit means and structurally connected to said reel means so as to ground said first circuit means upon rotation of said reel means for a preselected distance in a belt protracting direction, whereby said first circuit means becomes energized;
 c. electromagnetic means connected to said first circuit means so as to be energized upon the grounding thereof, and magnetically coupled to said locking means, said electromagnetic means being operable when energized to disable said locking means;
 d. second circuit means connected to said first circuit means for deenergizing said electromagnetic means after said preselected time interval.

7. A safety belt retractor as recited in claim 6, wherein said second circuit means is in series with said first circuit means and includes the series combination of a capacitor and a resistor.

8. A safety belt retractor as recited in claim 6, wherein said second circuit means includes as said timer means a timer circuit means operable to energize said electromagnetic means for said preselected time interval.

9. A safety belt retractor as recited in claim 8, wherein said timer circuit means includes a transistor having its collector emitter circuit in series with and between said electromagnetic means and said switch means and its base in series with the series combination of a capacitor and a resistor.

10. A safety belt retractor as recited in claim 9, wherein said timer circuit means includes a second transistor having its base emitter circuit in series with and between said resistor and the base of said transistor and its collector emitter circuit in series with and between said electromagnetic means and the base of said transistor.

11. A safety belt retractor as recited in claim 8, including electrical deactivating means connected to said second circuit means and adapted for connection to the gear selector of a vehicle, for deactivating said timer circuit means when the transmission of the vehicle is placed in a driving gear.

12. A safety belt retractor as recited in claim 11, wherein said timer circuit means includes a transistor having its collector emitter circuit in series with and between said electromagnetic means and said switch means and its base in series with the series combination of a capacitor and a resistor, and said electrical means includes a second switch means connected to ground and to said second circuit means between said capacitor and said resistor for said timer circuit means.

* * * * *